Aug. 26, 1969   M. BASCHE   3,463,119
NICKEL-MERCURY AMALGAM SEAL
Filed Jan. 30, 1968
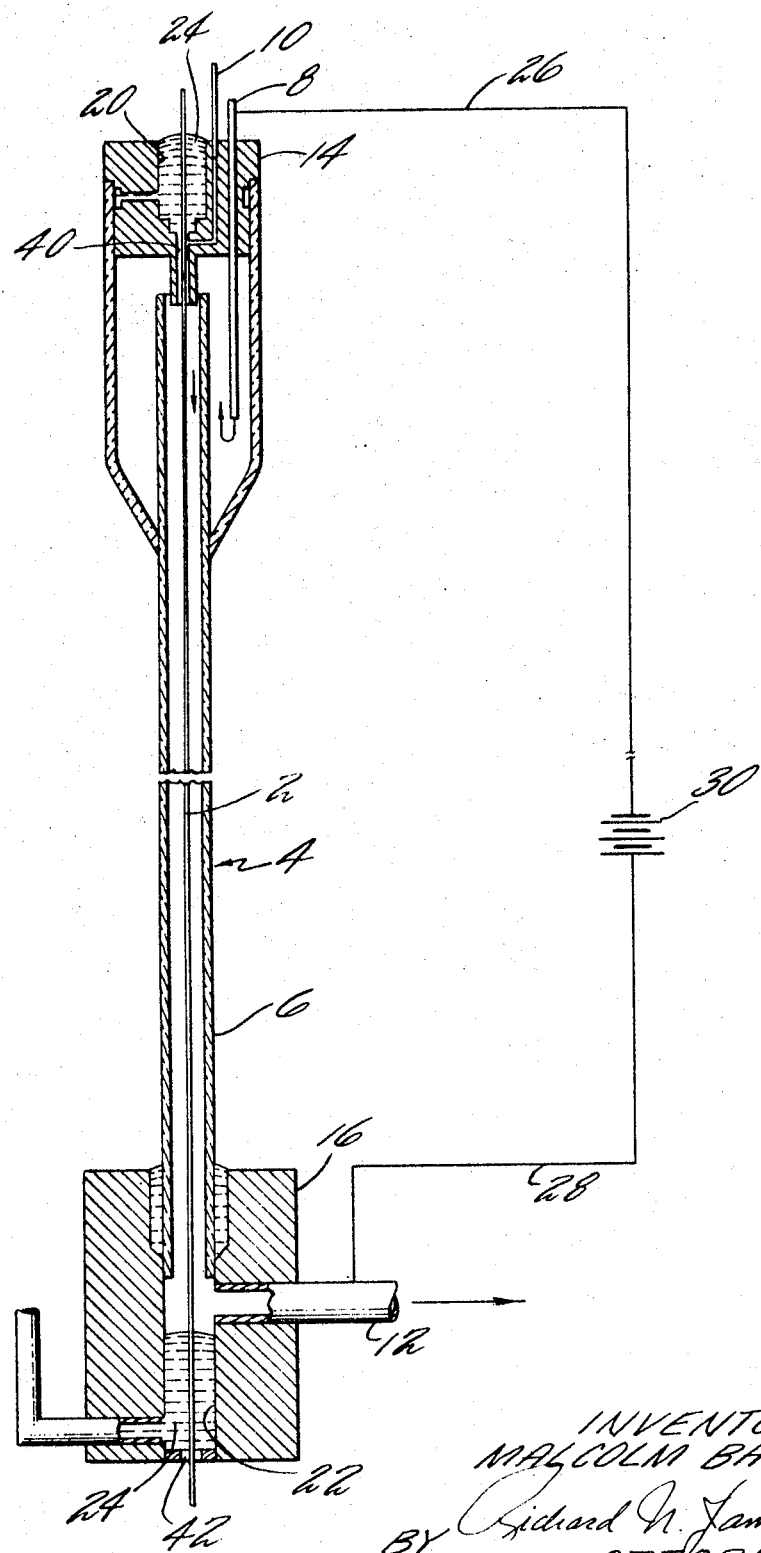
INVENTOR
MALCOLM BASCHE
BY Richard N. James.
ATTORNEY

3,463,119
NICKEL-MERCURY AMALGAM SEAL
Malcolm Basche, West Hartford, Conn., assignor to United Aircraft Corporation, East Hartford, Conn., a corporation of Delaware
Filed Jan. 30, 1968, Ser. No. 702,163
Int. Cl. C23c *13/08;* B65d *53/06*
U.S. Cl. 118—49.5      4 Claims

ABSTRACT OF THE DISCLOSURE

In a reactor wherein pyrolytic deposition takes place on a resistively-heated moving wire, the wire is drawn through an orificed fitting containing a nickel-mercury amalgam which performs the dual function of providing a gas seal around the wire and effecting electrical contact therewith.

Background of the invention

The present invention relates to reactor seals and, more particularly, to an improved reactor seal incorporating a nickel-mercury amalgam as the active sealing means.

It is known that filamentary materials may be conveniently produced or coated by pyrolytic techniques wherein the desired material is deposited on a resistively heated substrate which is drawn through a gaseous reactant mixture containing the material in vapor form. One such technique is disclosed in a copending application, Ser. No. 618,512, entitled "Process for Forming Stiochiometric Silicon Carbide Coatings and Filaments," by Malcolm Basche and Urban E. Kuntz, which shares a common assignee with the present application. According to this method, the wire upon which deposition is desired is introduced to and exits from a tubular reactor through a fitting provided at each end thereof, each fitting being fabricated to form a retention well for a pool of liquid metal, such as mercury. The mercury performs a dual function. It prevents the escape of the reactant gases along the wire as it is rapidly drawn through the reactor and, further, affords convenient means through which power may be supplied to the wire for resistance heating purposes.

A number of the more exotic filamentary materials are currently produced by techniques and in equipment similar to that described. A basic problem in these processes, however, is an inherently slow rate of production which in turn increases the cost of the end product. While it is known that the production rates may usually be increased significantly through the use of higher pressures in the reaction chambers, these higher pressures have nevertheless not been utilized because of the inability of the mercury to retain the gases at the higher pressures.

Summary of the invention

In accordance with the present invention, there is provided a reactor seal which permits the use of higher reactant gas pressures than those currently employed in pyrolytic deposition processes.

Briefly described, this invention comprises a reactor seal having an orificed fitting formed to provide a sealant well therein and containing a nickel-mercury amalgam in the well. The orifice in the fitting is made large enough and so oriented that the free passage of the wire therethrough is accommodated, but is formed small enough so that, in combination with the wire, the amalgam is retained in the well through surface tension forces. In general, an amalgam composition containing one-half to three percent by weight nickel will be found satisfactory, although one to two weight percent nickel is preferred.

Brief description of the drawing

The drawing illustrates somewhat schematically, a typical pyrolytic reactor incorporating end seals utilizing the teachings of the present invention.

Description of the preferred embodiments

As shown in the drawing typical reaction equipment of the type described includes a gas reactor 4 through which a resistively heated wire 2 is drawn. The reactor comprises a tubular containment vessel 6 having dual gas inlets, 8 and 10, at its upper end, and a single exhaust 12 at its lower end. The gas inlets and the exhaust penetrate and are electrically connected to metallic end fittings, 14 and 16, which provide the closure for the containment vessel.

Although the end fittings differ in overall configuration, they both incorporate a number of common features. They are each formed to provide a well, 20 and 22, respectively, for containing the nickel-mercury amalgam 24, and are further provided with a centrally-oriented orifice, 40 and 42, which is small enough to retain the amalgam in the respective wells. In operation of the apparatus the effective orifice size is established by the combination of the orifice in the fitting together with the wire which passes therethrough. The orifice may be established in the fitting in one alternative construction, through the use of a jewelled insert, rather than integral with the fitting as illustrated.

Electrical contact between the moving wire and the respective end fittings is provided by the amalgam, and the end fittings are in turn connected through the tubes 8 and 12, and the leads 26 and 28 to a suitable D.C. power source 30.

The reactor seals of the present invention are provided by the combination of the end fittings together with a nickel-mercury amalgam which provides the key to the improved reactor performance. The increased viscosity and surface tension forces afforded by the amalgam, as compared to the unalloyed mercury, have permitted the use of higher reactant gas pressures in the systems of the type described with less loss of sealant and greater ease of handling. With the increased ease of handling has come an increased factor of safety in terms of mercury ingestion by operating personnel.

Generally speaking, the amalgam is formed to a composition wherein the nickel comprises ½–3 percent by weight of the amalgam. The solubility of nickel in mercury at room temperature is very low, however, so that only a very small percentage of the nickel is actually dissolved in the mercury. Even with nickel compositions as low as 2.88 weight percent, some separation of the components will occur if the amalgam is left to stand at room temperature for a considerable period of time.

The amalgam is prepared by electrolytically depositing nickel onto the mercury utilizing an electrolyte of the following composition.

| | G./l. |
|---|---|
| Nickel sulfate | 240 |
| Nickel chloride | 55 |
| Boric acid | 30 |

The electrolyte is floated on a pool of mercury in a dielectric beaker, the mercury comprising the cathode. Contact with the mercury is made utilizing a nickel rod which is insulated with Teflon where is passes through the electrolyte. A nickel sheet, comprising the anode, is immersed in the electrolyte, and means is provided for agitating the mercury. Plating is accomplished at room temperature and the current is adjusted until bubbles appear at the anode at which time stirring is initiated.

The amalgamation process is allowed to continue until about one-half to three weight percent nickel is provided in the mercury. As previously indicated, at the higher nickel levels some segregation of the materials is normally observed if the amalgam is left to stand at room temperature. In practice, the mixture has been filtered through a fifty mil orifice prior to use, a mixture containing one to two weight percent nickel generally resulting. Since in use, the reactor and wire heat the amalgam, an additional amount of nickel in solid solution is provided, and particle segregation during operation of the reactor seals has never been encountered.

In terms of its physical properties, the density of the amalgam varies very little from that of the unalloyed mercury because of the very low nickel content. There is, however, a substantial increase in the viscosity of the liquid metal through the nickel addition, the amalgam having a typical viscosity of about 1.9 centipoises as compared to a viscosity of 1.5 centipoises in the case of pure mercury.

From the foregoing description, taken together with the drawing, it will be apparent that by this invention simple, easily-practiced means has been provided for improving the efficiency of pyrolytic gas reactors and similar apparatus utilizing liquid metal, reactor seals.

What is claimed is:
1. In a vessel wherein material deposition is effected on a moving substrate, an end seal comprising:
   a fitting having a well therein traversed by the substrate, the lower end of the well being provided with an orifice shaped and sized to closely conform to the substrate and oriented to permit the free passage of the substrate therethrough, and
   a nickel-mercury amalgam in the well, the amalgam containing about ½–3 percent by weight nickel.
2. An end seal according to claim 1 wherein: the amalgam contains about 1–2 percent by weight nickel.
3. In a reactor wherein pyrolytic deposition of a material takes place on a resistively heated moving wire, a reactor end seal comprising:
   a metallic fitting adapted to fit at the end of the reactor pressure vessel in a hermetic seal, the fitting having a well formed therein and aligned with the wire, the lower end of the well being provided with an orifice large enough to permit the free passage of the wire therethrough but small enough to, in combination with the wire, establish an effective opening small enough to retain a liquid metal in the well through surface tension forces; and
   a nickel-mercury amalgam in the well, the amalgam consisting essentially of by weight ½–3 percent nickel, balance mercury.
4. A reactor end seal according to claim 3 in which: the amalgam consists essentially of by weight, 1–2 percent nickel, balance mercury.

References Cited
UNITED STATES PATENTS

| | | | |
|---|---|---|---|
| 1,144,595 | 1/1915 | Henderson | 118—48 X |
| 2,215,686 | 9/1940 | Buchet | 277—135 X |
| 2,929,705 | 3/1960 | Hohn et al. | 75—81 X |
| 3,114,811 | 12/1963 | Kohman | 335—58 |
| 3,367,304 | 2/1968 | Robbins | 118—49.5 |
| 3,130,073 | 4/1964 | Van der Linden et al. | 118—47 X |
| 3,155,804 | 11/1964 | Gewirtz | 200—166 |

FOREIGN PATENTS
660,221 10/1951 Great Britain.

OTHER REFERENCES
"Constitution of Binary Alloys," Elliott, 1st Supplement (1965), McGraw-Hill, p. 534.

MORRIS KAPLAN, Primary Examiner

U.S. Cl. X.R.

200—166; 219—155; 277—135; 339—115